United States Patent [19]
Rafine

[11] 3,915,719
[45] Oct. 28, 1975

[54] BINDERS FOR CONCRETE AND CONCRETES UTILIZING SAID BINDERS

[75] Inventor: Jean Rafine, Figanieres, France

[73] Assignee: Societe a Responsabilite Limitee dite: ECOTEC, La Soliniere, France

[22] Filed: June 4, 1973

[21] Appl. No.: 366,564

Related U.S. Application Data

[63] Continuation-in-part of Ser. No. 145,578, May 20, 1971, abandoned.

[30] Foreign Application Priority Data
May 22, 1970 France .............................. 70.18664
Apr. 1, 1971 France .............................. 71.12398

[52] U.S. Cl. ...................... 106/64; 106/97; 106/104
[51] Int. Cl.² ...................... C04B 7/02; C04B 35/02
[58] Field of Search ........................ 106/64, 97, 104

[56] References Cited
UNITED STATES PATENTS

| | | |
|---|---|---|
| 2,419,684 | 4/1947 | Johnson et al. ........................ 106/64 |
| 2,527,500 | 10/1950 | Norton et al. ......................... 106/64 |
| 2,558,782 | 7/1951 | Ratcliffe ............................... 106/64 |
| 3,181,959 | 5/1965 | Raine et al. ........................... 106/64 |
| 3,226,240 | 12/1965 | Crowley ............................... 106/64 |

*Primary Examiner*—J. Poer
*Attorney, Agent, or Firm*—Brisebois & Kruger

[57] ABSTRACT

Concrete comprises binder containing 3 to 12% of an aluminous cement having little free lime, from 4.56 to 9.73% of a phyllite clay having a base-exchange capacity of at most 10 milliequivalents per 100 grams and a flake-like structure consisting of at most two layers so that when water is added the mixture flows according to Newton's laws instead of Binghame's equation. The percentages given are based on the total weight of the concrete.

5 Claims, No Drawings

BINDERS FOR CONCRETE AND CONCRETES UTILIZING SAID BINDERS

SUMMARY OF THE INVENTION

This application is a continuation-in-part of application Ser. No. 145,578 filed May 20, 1971, now abandoned.

It relates particularly to the use of a binder for use in making refractory concretes for lining furnaces and imparts to these concretes advantageous properties with respect to their resistance to compression, both before and after firing, as well as improved mechanical properties which are necessarily different from those of certain refractory coatings intended to be simply sprayed onto the subjacent refractory linings of the furnaces.

In particular, U.S. Pat. No. 3,181,959 to Raine and Smith discloses such refractory coatings which are adapted to resist temperatures of 1,038°C, but do not have any great resistance to compression, since the principal property required for such coatings is to have no "rebound."

Moreover these coatings contain high percentages of plastic clays and they do not flow in accordance with Newton's laws, which renders them unsuitable for the manufacture of concretes for lining furnaces.

It has already been suggested that binders for concretes containing cement and clay as well as wetting and deflocculating agents be provided in order to improve the mechanical properties of certain concretes, whether refractory or not, by utilizing a minimum quantity of mixing water.

However, applicant's experiments have shown that it is not possible to satisfactorily resolve the problem posed unless the clays used are of a high purity and a phyllite nature, said clays being selected from the group consisting of kaolinites, having a flake-like structure comprising only two layers, and for this reason a minimal tendency to expand.

Moreover it is essential that the clays have a very low capacity to exchange bases, equal to or less than ten milliequivalents per hundred grams.

The use of such non-swelling clays of high purity having a very low base exchange capacity makes it possible to avoid certain secondary reactions which are capable of inhibiting or rendering impossible deflocculation of the paste serving as the binder.

The montmorillonites which contain layers of water and comprise alkaline and alkaline earth ions in their structure, and in particular bentonites, must be avoided for this reason, as must the illites and chlorites.

The clay used must also take the form of ultra-fine solid particles having colloidal properties.

Moreover the clays in question must be selected as a function of their rheological properties so as to make it possible to obtain by means of these binders an excellent coating of the aggregates and make concretes made with these binders easy to handle.

On the other hand, cement of the Portland type, which may be suitable for the coatings mentioned above, or for the manufacture of ordinary construction concrete are unsuitable for the practice of this invention because the free lime therein has an adverse effect on the refractory property of any concrete utilizing binders containing both such cements and clay and also on their resistance to compression.

The binders according to this invention are therefore made by utilizing aluminous cements such, for example, as the cement sold under the trademark SECAR 250 by S. A. Ciments Lafarge and the standard cement of the German firm Rollandshutte of Lubeck.

The formulas and characteristics of these aluminous cements will be hereinafter set forth.

Moreover, the binders in question must contain additives of the aforesaid type which make it possible to disperse or deflocculate the paste obtained by contacting a homogenous mixture of cement and clay with water.

This paste must, in effect, lose all its plasticity in the presence of these additives and take the form of a non-plastic fluid, that is to say a Newtonion fluid (one which flows in accordance with Newton's law), while in the absence of such additives this fluid would act in accordance with Bingham's equation, that is to say like a soft solid which deforms only when subjected to a force greater than a critical threshold force.

It is easy to understand, that in the absence of such deflocculating agents, it is impossible to obtain a non-plastic paste or a paste of low plasticity except by greatly increasing the quantity of water incorporated into the paste.

However, as has already been pointed out in discussing the mechanical properties of the concretes, this increase in quantity of water has extremely undesirable effects upon the resistance to compression before firing, which resistance is in any case much lower than the resistance to compression after firing, which latter is notably increased because of the transformation of clay contained in the binder into crystals of mullite or corundum when the concrete is heated to a temperature in excess of 1,300°C and which may reach 2,000°C, the temperature being variable in dependence upon the aggregate used.

By way of example, it may be said that a concrete utilizing fine clay containing 22.5% by weight of a binder having a base of clay and an aluminous cement in accordance with the invention and containing an amount of water amounting to about 10% by weight of the final weight of the concrete after setting has, before firing, a resistance to compression of the order of 400 bars and may acquire by firing at 1,400°C a resistance to compression of 1,100 bars.

When an aggregate is used comprising a high percentage of corundum, of the order to 85%, together with a binder in accordance with the invention, it is possible to obtain before firing a resistance to compression of 737 bars which is increased notably during firing at 1,550°C to reach a final resistance to compression of 1,800 bars. The transformation of the clay of the binder into mullite or corundum improves the mechanical and refractory properties of the product when this particular aggregate is used.

Moreover, the porosity of the refractory concretes using the new binders is substantially reduced because of the reduction in the quantity of the mixing water necessary to its manufacture.

In practice, it is possible to produce concretes having an apparent density greater than 2 grams per cubin centimeter by utilizing a quantity of water between 6 and 10% by weight of the final cured but unfired product, instead of conventional quantities which run between 12 and 16% by weight.

It should be noted that, in the prior art coatings, the quantities of plastic clay used are much higher than those of the non-plastic clays contained in the binder according to the present invention.

It should also be noted that, if the aluminous cements used still contain a certain percentage of lime, this lime is present in the form of calcium aluminate or possibly calcium silicate and not in the form of free lime which interfers with deflocculation when present in excessive quantities. Moreover, the presence of this lime, combined in the form of aluminate or silicate facilitates the formation of mullite or corundum from the clay during the firing at high temperature so as to considerably increase the resistance to compression after firing of the refractory concretes.

It will also be noted that certain impurities contained in the aluminous cement in question may facilitate the formation of a substantial quantity of mullite or corundum.

The deflocculating and wetting agents which have already been mentioned and which are required to deflocculate the clay and the aluminous cement of the binder are electrolytes and may be selected either singly or in a mixture, from the group consisting of all alkaline salts off phosphoric acid, silicic acid, citric acid and sodium hexametaphosphate and the alkaline salts of certain organic acids, such as, sodium tannate and sodium humate, or even from the alkaline salts of weak mineral acids such as carbonic acid for example.

In order to obtain a high percentage of mullite it is preferable to use aggregates which are selected from the group consisting of aluminous materials or silico-aluminous materials. These aggregates may also be selected from other groups of materials such as chromite of silicon carbide, for example, which are in themselves capable of imparting to concretes utilizing such binders a refractoriness or an insulation superior to those of refractory concretes of a conventional type.

When utilizing a binder comprising an aluminous cement and clay having the characteristics above pointed out together with said of additives and a variable weight of refractory aggregates constituting from 92.4 to 77.36% of the total weight of the concrete, the respective weights of cement, clay and additives as compared with the total weight of the resulting refractory concretes, may vary within the following limits:

| Cement | 3–12% |
|---|---|
| Clay | 4.56–9.73% |
| Additives | 0.04–0.91% |

The aggregates used may be dense or expanded depending upon the purpose sought and the final density of the concrete to be obtained. The use of the new binder also has the advantage of making it unnecessary to moisten the concrete after it has been put in place as is now commonly required.

Finally, it may be advantageous to add to the aggregates and to the binder a setting accelerator without thereby sacrificing the particular characteristics of the binder and the concrete which results from the use of the binder.

Two examples of a refractory concrete according to the invention will now be described, one of which uses as the aggregate a burnt expanded clay of German origin and a binder containing the standard aluminous cement made by the Societe Rollandshutte of Lubeck, while the other utilizes corundum base aggregates and a binder containing aluminous cement sold under the trademark SECAR 250 by S. A. Ciments Lafarge.

The composition of the German cement of the Rollandshutte Company of Lubeck is as follows:

| $Al_2O_3 + TiO_2$ | 46–53 | % |
|---|---|---|
| CaO | 37–42 | % |
| $SiO_2$ | 6–99 | % |
| FeO | 0.4–1 | % |
| MnO | 0.3 | % |
| MgO | 1.5–2 | % |
| S | 1 | % |
| $SO_3$ | 0.4 | % |

This aluminous cement is of the fused type and is light in color. It is made in a blast furnace in a reducing atmosphere.

Its fusion point is 1,380°C and its apparent density 1.22 g/cm³. Such a cement is useful for making concretes which may be worked at temperatures of as low as −15°C.

The cement SECAR 250 of the S. A. Ciment Lafarge is of the calcium aluminate type, of high purity and white color. Its composition is as follows:

70% alumina
29% lime
1% impurities, such as iron, silicon, etc.

It will not collapse under a weight of 2 kg/cm² until heated to 1,300°C. Its melting point is 1,650°C. Its apparent density is 1.08 g/cm².

EXAMPLE 1

Refractory concrete having an expanded burnt clay base

| Aggregates | Expanded burnt clay (German) 0–12 mm (containing more than 35% $Al_2O_3$, 550 kg of which is in granules 1–2 mm in diameter and 280 kg of which is in granules less than 1 mm in diameter.) | |
|---|---|---|
| Binder | Rollandshutte standard cement | 100 kg |
| | Kaolin clay | 70 kg |
| | Additives | |
| | a. sodium hexametaphosphate | 620 g |
| | b. sodium pyrophosphate | 620 g |
| | Water necessary to Mix: 18–22 liters per 100 kg. | |

A concrete with a binder according to the invention as in the above example has the following characteristics:

| Apparent density | 1.10–1.20 |
|---|---|
| Resistance to compression while cold | 50–70 kg/cm² |

(These two characteristics are those of a raw, dry concrete). After firing at 1,300°C, this concrete has the following properties:

| Apparent density | 1.10–1.20 |
|---|---|
| Resistance to compression | 135–190 kg/cm² |
| Dimensional variations | −1% to −2% |

It should be noted that in this example the raw concrete has been tamped in place.

EXAMPLE 2

| Aggregates | Corundum particles having a diameter of 1–7 mm | 750 kg |
|---|---|---|
| | Corundum particles having a diameter less than 1 millimeter | 100 kg |
| Binder | Cement (SECAR 250 Lafarge) | 100 kg |
| | Kaolin clay | 50 kg |
| Additives | | |
| | a. sodium hexamethaphosphate | 500 g |
| | b. sodium pyrophosphate | 500 g |
| | Mixing water | 6–8 liters per 100 kg |

The binder, when used according to the principles and the proportions of the invention imparts the following characteristics to the concrete:

1. When raw and dried:
   - Apparent density: 3–3.10
   - Resistance to compression: 600–800 kg/cm$^2$
   - Porosity: 12–15%
2. After baking at 1650°C:
   - Apparent density: 3.10–3.20
   - Resistance to compression: 1400–1800 kg/cm$^2$
   - Porosity: 12–15%
   - Dimensional variations: −1% to −2%

In this example the raw concrete has been put in place with a vibrator.

It will nevertheless be noted that when a dense concrete is to be produced, the fact that perfect liquefication of the clay can be obtained with a minimum amount of water makes it possible to produce concretes of greater density.

Moreover, in the case of light concretes, the choice of clay used may make it possible to decrease the quantitites of cement which must be incorporated in the binder.

In order that the invention may be better understood.

It should be appreciated that a linear curve of the variation of the force which must be applied to a paste to obtain an increasing speed fo deformation may be drawn. The tangent of the angle between this line and the abscissa will correspond to the viscosity of the paste which is to be deformed, while the ordinate at the origin of said line will represent the value of the threshold critical force above which the plastic paste begins to deform at a speed varying linearly as a function of the force which is applied thereto.

In the case of a deflocculated paste consisting of a non-plastic liquid obeying Newton's laws this curve is a line passing through the origin of the abscissa and the ordinate and the tangent of the angle between this line and the abscissa corresponds to the viscosity of the liquid.

Another curve may be drawn showing the variation in the resistance R to cold compression of a refractory concrete before firing, as a function of the percentage of clay in the binder used.

This curve will have first a minimum $R_m$ for a predetermined percentage of clay $m$ which is in general greater than three percent of the total weight of the refractory concrete in question.

This curve will then show an inflection point and a maximum $R_M$ corresponding to a value M for the percentage of clay for which the resistance to compression is maximum and greater than the resistance to the compression in the absence of clay.

Of course, the quality of the cement used may modify the minimum and maximum values as well as that of a limit L for the clay content, from which point the resistance to cold compression decreases very rapidly but, in any case, experience has shown that this percentage limit L for normal quantities of cement used is generally greater than 4.5% of the total weight of the refractory concrete.

These variations in the optimum clay content explain the respective limits on the percentages of cement, clay and additives which have been indicated above with respect to the total weight of the refractory concrete.

What is claimed is:

1. A binder combined with combined refractory aggregate and water to form a settable refractory mix consisting essentially of said binder, aggregate and water, with the initial quantity of water being substantially equal to 6–10% of the final weight of the mix after setting, and said binder comprising from 3–12% by weight of aluminous cement, based on said final weight of said mix, from 4.56 to 9.73% by weight of said clay and 0.04–0.91% of said deflocculating agent, and the clay in said binder consisting essentially of at least the phyllite clay selected from the kaolinite group, having a flake-like structure comprising a maximum of two layers so as to have minimal expansibility, and having a very low base exchange capacity of at most 10 milliequivalents per 100 grams.

2. Mix as claimed in claim 1 which comprises 70% by weight of refractory aggregates, 20% by weight of binder, and 10% by weight of mixing water.

3. Mix as claimed in claim 2 which comprises 8.65% by weight of clay, 10.65% aluminous cement, and 0.7% said deflocculating agent.

4. Mix as claimed in claim 1 which comprises a corundum base aggregate equal to 80% of the total weight of the concrete, a weight of binder equal to 14% of the total binder and a weight of mixing water equal to 6% of the total weight.

5. Mix as claimed in claim 4 in which said binder comprises 4.61% clay, 9.22% aluminous cement and 0.17% deflocculating agent by percent of the total weight of said mix.

* * * * *